United States Patent
Volpi

(10) Patent No.: US 6,755,370 B2
(45) Date of Patent: Jun. 29, 2004

(54) SUPPORT BELT FOR STRIPS OF DEFORMABLE MATERIAL, APPARATUS FOR USING THE BELT, AND RELATED METHODS

(75) Inventor: Alessandro Volpi, Milan (IT)

(73) Assignee: Pirelli Pneumatici Spa, Milano (IT)

( * ) Notice: Subject to any disclaimer, the term of this patent is extended or adjusted under 35 U.S.C. 154(b) by 433 days.

(21) Appl. No.: 09/886,488

(22) Filed: Jun. 22, 2001

(65) Prior Publication Data

US 2002/0036045 A1 Mar. 28, 2002

Related U.S. Application Data

(63) Continuation of application No. PCT/EP00/10347, filed on Oct. 19, 2000.
(60) Provisional application No. 60/164,963, filed on Nov. 12, 1999.

(30) Foreign Application Priority Data

Oct. 27, 1999 (EP) .............................................. 99203541

(51) Int. Cl.[7] .............................................. B65H 18/08
(52) U.S. Cl. ....................... 242/528; 242/536; 242/602; 428/102; 428/188
(58) Field of Search ............................... 242/536, 602, 242/528, 530.2; 428/188, 102, 35.2; 156/405.1, 406.4

(56) References Cited

U.S. PATENT DOCUMENTS

| | | | | |
|---|---|---|---|---|
| 1,830,791 A | * | 11/1931 | Guinzburg | 428/188 |
| 2,336,754 A | * | 12/1943 | Schelhammer et al. | 242/536 |
| 3,165,751 A | * | 1/1965 | Clark | 428/188 |
| 3,290,184 A | * | 12/1966 | Minck | 242/536 |
| 3,420,365 A | | 1/1969 | Bailey | |
| 4,069,359 A | * | 1/1978 | DeMarse et al. | 206/412 |
| 4,113,092 A | | 9/1978 | Williams | |
| 4,520,054 A | * | 5/1985 | Pfeiffer | 428/188 |
| 5,004,635 A | | 4/1991 | Griebling | |
| 6,586,062 B1 | * | 7/2003 | Deschamps | 428/188 |

FOREIGN PATENT DOCUMENTS

| | | |
|---|---|---|
| GB | 1495803 | 12/1977 |
| JP | 7-290596 | 11/1995 |

* cited by examiner

Primary Examiner—John M. Jillions
(74) Attorney, Agent, or Firm—Finnegan, Henderson, Farabow, Garrett, & Dunner, L.L.P.

(57) ABSTRACT

A belt for supporting strips of deformable material includes a flexible central band. One or more strips are placed onto the band. Variable-configuration air chambers are arranged along edges of the band. The air chambers, when inflated, may have upper and lower surfaces that are substantially flat and substantially parallel to the band. An apparatus for using the belt includes a storage coil, a take-up winding, and first, second, and third devices. A first part of the belt is wound onto a reel of the storage coil with a first tension. A second part of the belt is wound onto a beam of the take-up winding with a second tension greater than the first tension. The first devices vary the first and second tension, the second devices keep the air chambers in the first part of the belt inflated, and the third devices rotate the reel and beam.

27 Claims, 4 Drawing Sheets

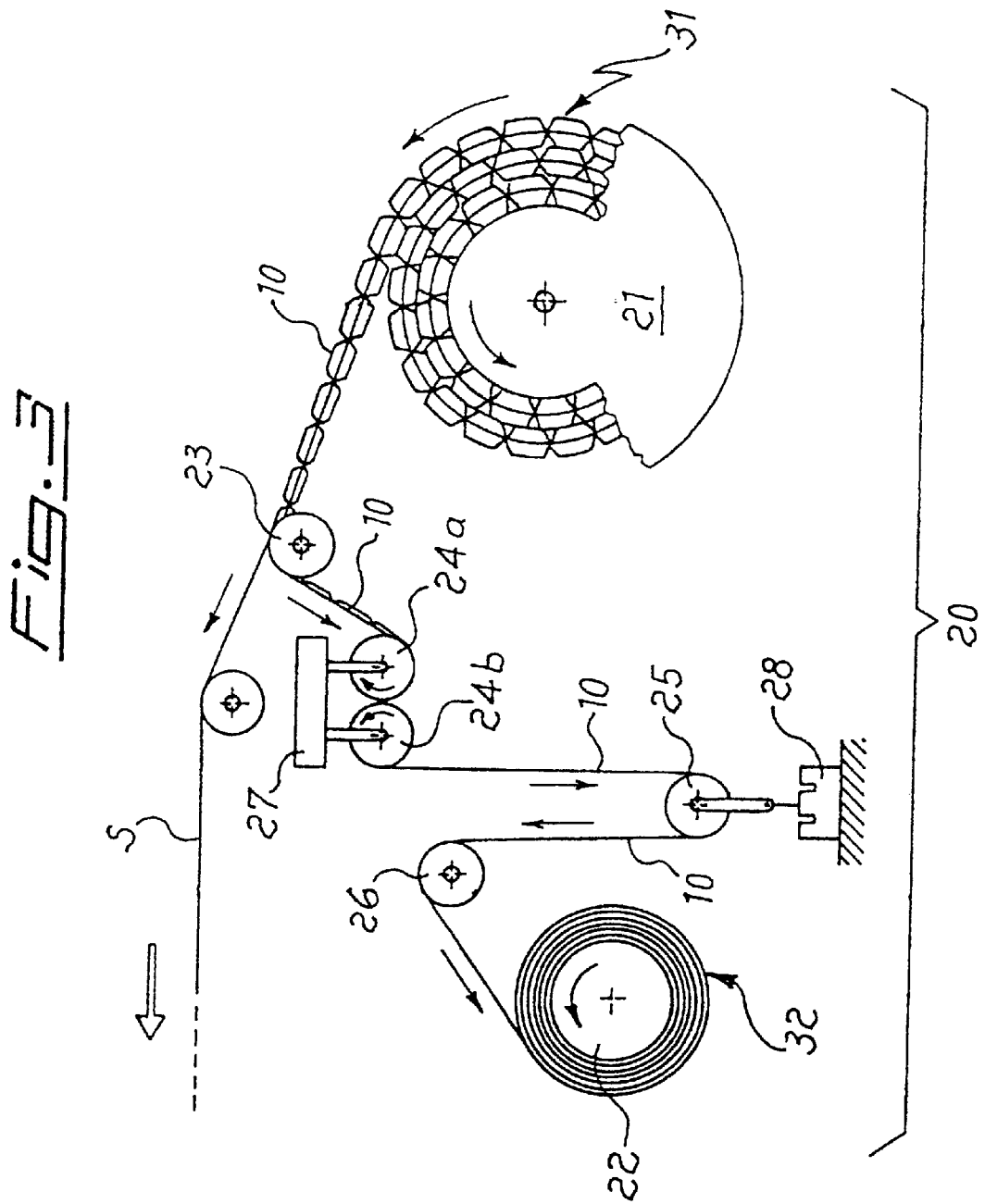

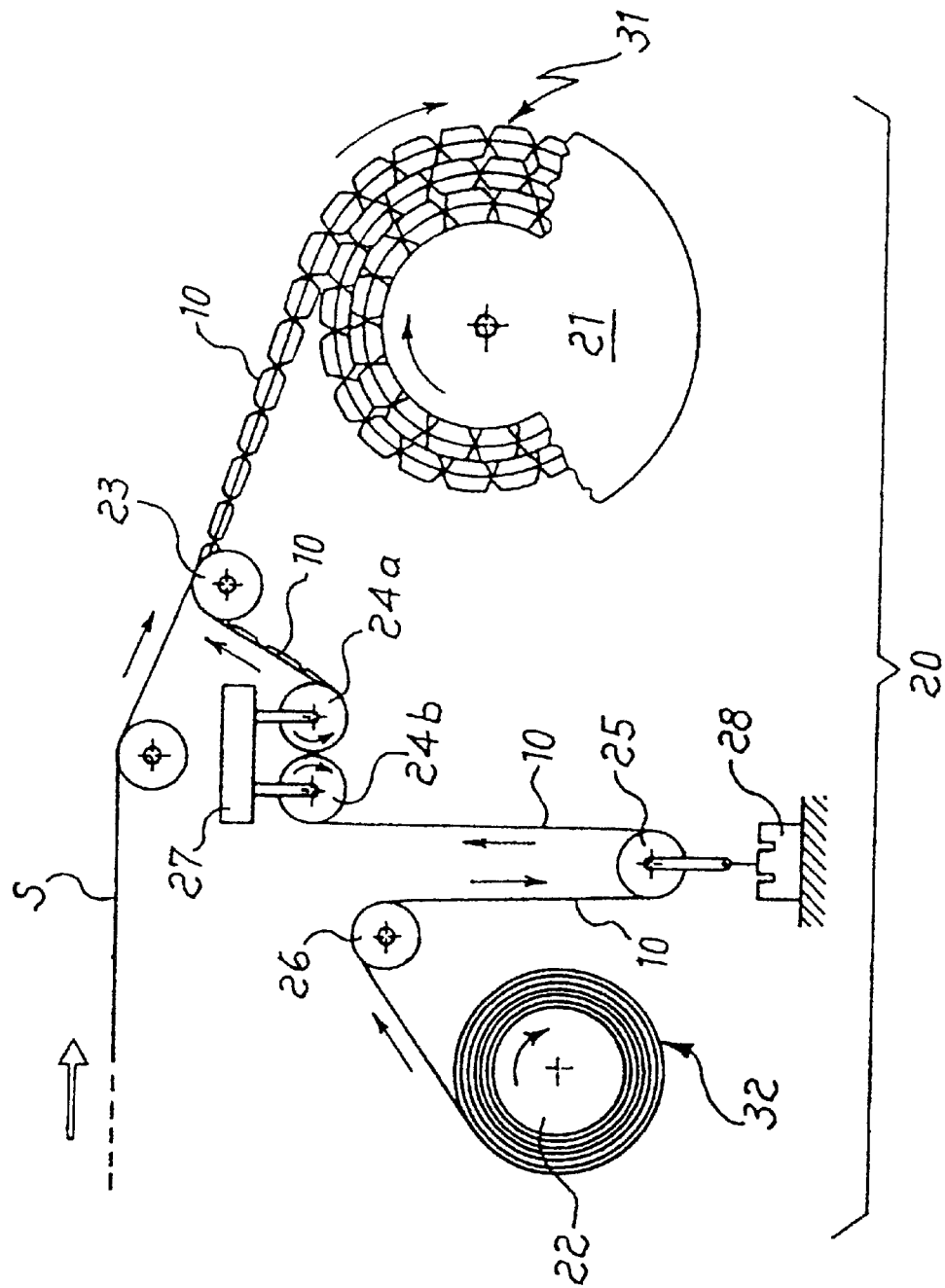

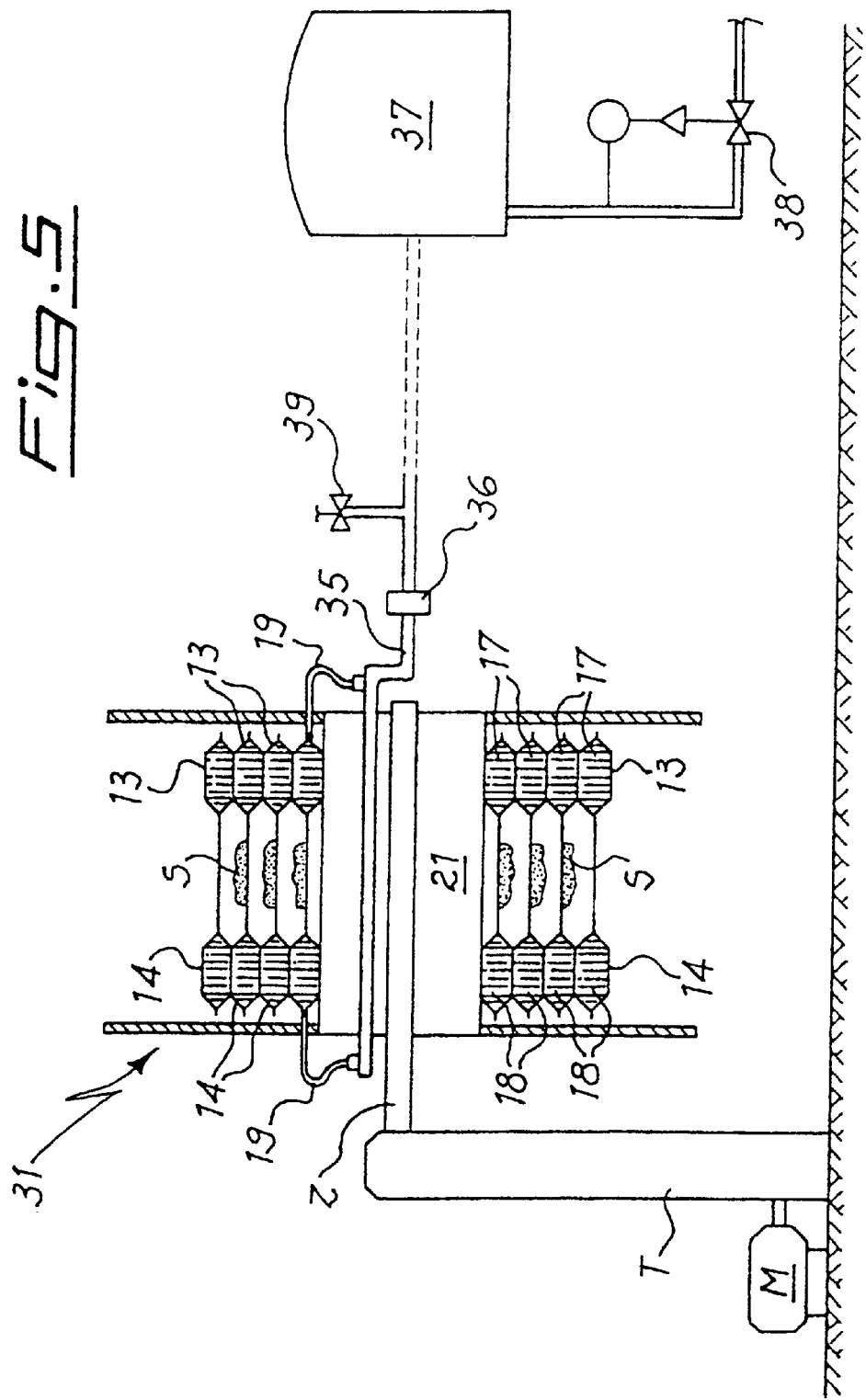

SUPPORT BELT FOR STRIPS OF DEFORMABLE MATERIAL, APPARATUS FOR USING THE BELT, AND RELATED METHODS

CROSS-REFERENCES TO RELATED APPLICATIONS

This application is a continuation of International Patent Application No. PCT/EP00/10347, filed Oct. 19, 2000, in the European Patent Office; additionally, Applicants claim the right of priority under 35 U.S.C. §119(a)–(d) based on patent application No. 99203541.0, filed Oct. 27, 1999, in the European Patent Office; further, Applicants claim the benefit under 35 U.S.C. §119(e) based on prior-filed, copending provisional application No. 60/164,963, filed Nov. 12, 1999, in the U.S. Patent and Trademark Office; the contents of all of which are relied upon and incorporated herein by reference.

BACKGROUND OF THE INVENTION

1. Field of the Invention

The present invention relates, according in a general aspect, to the manufacture of tires.

2. Description of the Related Art

As is known, for the industrial manufacture of a tire various semifinished products are assembled together to form a single-piece structure, said products including a carcass ply, at least one pair of annular cores for reinforcing the beads, usually called bead cores, a belt structure, a pair of side-walls, a tread band and a plurality of other reinforcing or filling components which confer to the whole structure a predefined geometry as well as a predefined dimensions and all the mechanical-strength and all the qualitative characteristics which are necessary for a good performance of the tire on the road.

Some of these semifinished products consist of rubber strips having different width and thickness depending on the circumstances; in order to use them during the industrial production of the tires, they are arranged in special storage coils, wound as a continuous strip having a length equal to a multiple of the length necessary for a tire.

An example which illustrates this state of the art is described in British Patent No. 1,495,803 in the name of the Goodyear Tire & Rubber Company.

This patent, which was published in 1977, describes how, for the manufacture and the subsequent application of the components referred to above, the rubber strips supplied by a drawing machine or other production machine, are arranged on top of a thin fabric support belt unwound from a respective coil.

The use of this support belt, or other textile support, is necessary owing to the fact that the unprocessed rubber, in particular when it is still hot, is made of a plastic material which is highly deformable when subject to any type of stress and is therefore unable to withstand the pulling force which is necessary for feeding the belt to the tire forming machine: the main purpose of this belt is precisely that of withstanding this pulling force, protecting the semifinished product from unacceptable deformations.

The thin belt and the strip placed on it are then rolled up together so as to form a storage coil which will be used, during the production of the tires, to supply the required component to the abovementioned forming machines.

In this way the turns of each rolled-up rubber strip are separated from each other by the support belt, thereby avoiding the risk of becoming attached to each other: indeed, if the unprocessed rubber, soon after production, were rolled up into the coil without the presence of the belt, the wound turns would inevitably tend to adhere to each other, making it extremely difficult, if not even impossible, to separate them from each other and in any case subjecting the semifinished product to a pulling force which would change in an unacceptable manner the geometrical dimensions thereof, as well as the characteristics of homogeneity and uniformity.

The simple belt considered in the British patent cited above is not, however, entirely satisfactory: indeed, it cannot prevent compression of the rubber strip in the packing coil, owing to the weight which bears on the wound turns.

For this reason a special belt for supporting the rubber strips is currently known, as shown in FIG. 1.

As can be seen from the drawing, the belt 1 consists of a thin central band 2 of flexible material (for example that commercially known as "Mylar"), on the edges thereof the linear elements 3, 4, 5 and 6 are provided.

The latter essentially consist of reinforcing rims made of suitable materials, for example expanded elastomer material of suitable thickness, and have V-shaped incisions transversely cut so as to form basically a series of blocks 3a, 3b, 3c, 4a, 4b, 4c, etc.; in this way the belt is provided with the necessary flexibility so that it may be wound up on itself.

The linear elements 3–6 support the central band 2 on which the strip S of a component for the manufacture of tires (shown in broken lines in FIG. 1) is placed and serve as spacers between the various turns of the packing coil, when the belt 1 is wound together with the strip S.

This, obviously, provided that the thickness of the strip S is less than that of each pair of juxtaposed linear elements 3–6 in the winding.

In this connection, it must be noted how the flat configuration of the linear elements 3–6 ensures stable seating of the various turns, also in the case of relative displacement thereof in an axial direction with respect to the coil (caused for example by shocks or the like); this aspect will emerge more clearly from the description of the invention which follows further below.

There are, however, certain drawbacks associated with the known support belts of the type considered above.

Firstly it should be pointed out that the repeated belt winding and unwinding cycles may result in breakage, due to fatigue, of the central band 2 and in particular of the linear elements 3–6; indeed the materials from which these elements are made and referred to above, generally have a limited strength and in the long run are subject to breakage owing to the continuous mechanical stresses, in particular bending stresses, to which they are subject.

Secondly it must be pointed out that, owing to the limited bending strength of the aforementioned materials, it is not possible to wind the belt 1 with a radius below a certain limit value; consequently, the packagings obtained are generally bulky and in particular have the same dimensions both when they are full or empty.

In other words, since the thickness of the belt 1 is determined by that of the linear elements 3–6 and is therefore constant because the latter are made of semi-rigid material, the belt winding in the coil has the same dimensions, irrespective as to whether the strip S is present or not inside it.

This means that, also from a handling point of view, these coil packagings are disadvantageous because they occupy the same space when they are fill and when they are empty.

SUMMARY OF THE INVENTION

The Applicant has found that this state of the art may be overcome using a belt for storing semifinished products in the form of rubber strips used for the manufacture of tyres, comprising a central band for supporting the semifinished product, which is provided along its edges with spacing elements having a variable configuration.

According to a first aspect thereof, the invention relates to a belt for storing strip-shaped semifinished products, comprising a central support band along the edges thereof inflatable elements, in particular tubular air chambers, are arranged.

In accordance with a preferred embodiment of the invention, these air chambers have a configuration which has an upper face and a lower face substantially parallel to the central band.

According to a further aspect thereof, the invention also relates to a method and an apparatus for using the belt above, whose features are described further below and summarised in the claims which will follow.

BRIEF DESCRIPTION OF THE DRAWINGS

Further characterising features and advantages of the invention will emerge more clearly from the detailed description of a non-limiting embodiment thereof, which will be illustrated hereinbelow with reference to the accompanying drawings wherein:

FIGS. 3 and 4 show an apparatus for using the strip according to FIG. 2, in respective operating conditions and with a part removed;

FIG. 5 shows a view from another angle, and partially sectioned, of the abovementioned apparatus.

DETAILED DESCRIPTION OF THE PREFERRED EMBODIMENTS

Figure 1:
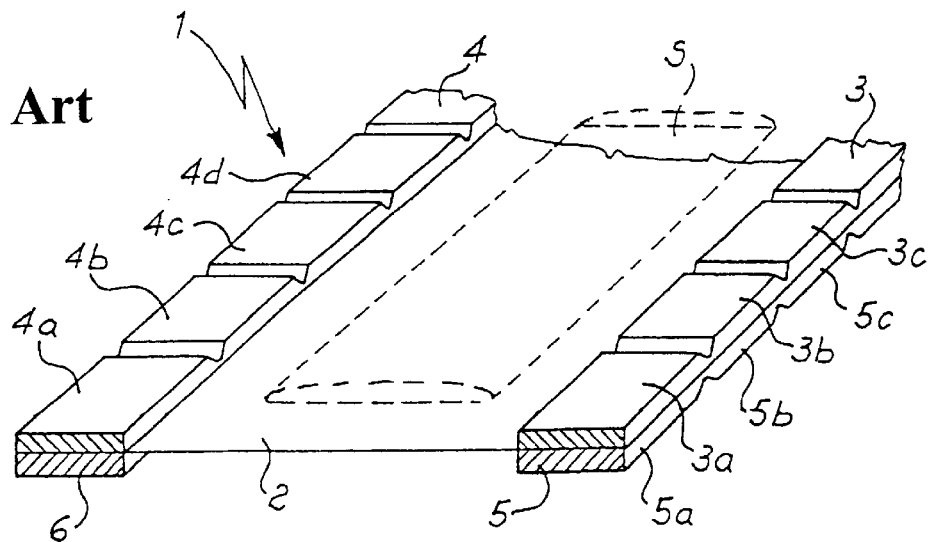
FIG. 1 shows, as already mentioned, a detail of a belt for storing strip-shaped semifinished products according to the known art.

In these drawings, 10 denotes the support belt according to the invention.

This belt comprises a central band 12 consisting of two juxtaposed sheets 12a, 12b made of a special fabric which will be better considered below; air chambers 13 and 14 are present along the edges of the central band. Said air chambers are preferably divided transversely into segments 13a, 14a, 13b; 14b, 13c, 14c; etc., by means of stitches 15 and 16; this helps to increase the flexibility of the belt 10, facilitating rolling-up thereof in a coil.

Figure 2:
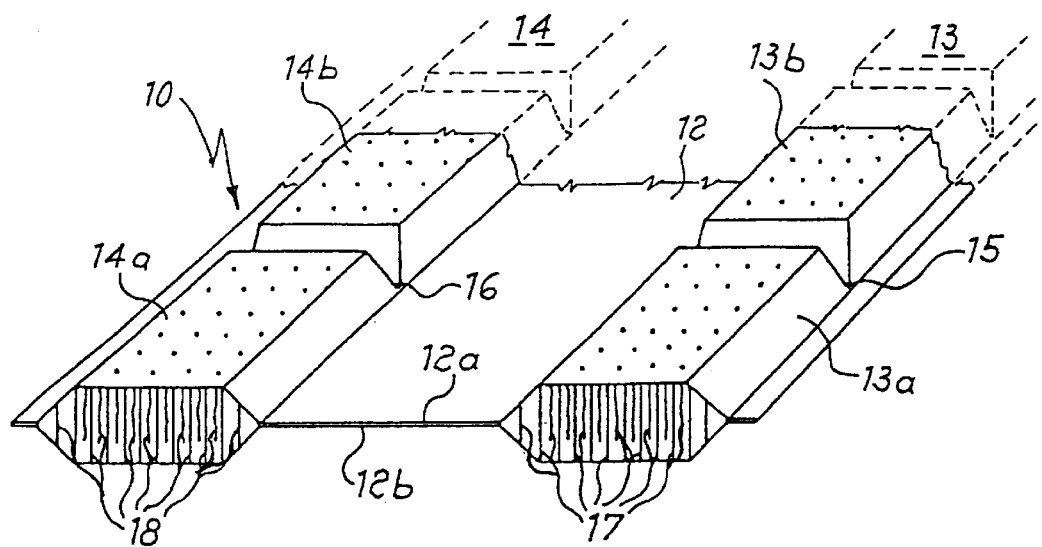
FIG. 2 shows a detail of a belt for storing strip-shaped semifinished products, according to the present invention.

As can be seen from FIG. 2, the belt 1 is obtained by superimposing two sheets 12a, 12b of fabric or other suitable material, connecting them together by means of strong threads 17 and 18 having the same length and situated inside the air chambers 13 and 14; along the central band. 12 as well as in the remaining zones of the belt, the two fabric sheets are kept attached to each other, for example by means of a special stitching.

Preferably, the belt 10 formed by the two superimposed sheets is obtained with a special fabric, commonly called Drop Stitch Fabric (abbreviated below as DSF) and used for other purposes, in particular in the field of air-inflated boats; in the present invention this fabric is made impermeable to air by means of lining with any suitable impermeable material, preferably of the polymeric type, for example plasticized PVC, or with polychloroprene or polyethylene chlorosulphonated, commercially known as "Hypalon".

This latter solution is to be preferred especially because of its chemical resistance to attack by oxidizing agents.

A fabric of the DSF type which may be used to implement the invention is commercially available from the French company TISSAVEL.

The threads 17, 18 are fixed to the fabric by means of stitching (obviously other solutions may be used for this purpose) and have the function of providing the air chambers 13 and 14 with the desired shape when they are inflated; indeed, if these threads were not present, the chambers 13 and 14 owing to the effect of the air under pressure, would assume a cylindrical or in any case convex tubular shape different from the substantially prismatic shape shown in FIG. 2.

In this case, indeed, since the threads 17 and 18 have the same length, they mutually retain the upper and lower surfaces of the respective air chambers 13, 14 when the latter are inflated, keeping them basically parallel with each other and the central band 12.

In these connection it should be pointed out that the transverse stitches 15 and 16 which define the segments into which the air chambers 13 and 14 are divided, allow the air to pass between one segment and the next one so that the latter communicate with each other: this helps to inflate and deflate the air chambers during use, as will be explained in greater detail below.

It hardly needs to be mentioned that for the operations involving inflation and deflation of the air chambers 13 and 14, the belt 10 is provided at one end with a pair of connectors 19 (one for each air chamber) so that they may be rapidly connected to a source of pressurised fluid.

During the course of the tire production cycle, the support belt 10 is used with the apparatus 20 which can be seen in FIG. 3.

This apparatus essentially comprises two rotating drums onto which the belt 10 is wound and unwound, depending on the operating phases.

More precisely, the first rotating drum consists of the reel 21 of a storage coil mounted on a spindle Z of an associated actuating group; the latter comprises, in a manner known per se, also a motor M and a transmission T.

The second rotating drum, on the other hand, comprises a "beam", i.e., a cylinder without lateral flanges, for axially containing the wound product. It is known that the reel differs from the beam precisely because of the presence of lateral flanges integral with the core.

The beam 22 is also mounted on a spindle, forming part of an associated actuating group, not shown in the drawings because it is similar to that already considered for the reel 21.

For the reasons which will emerge more clearly below, the diameter of the beam 22 in the apparatus according to the invention is preferably smaller than that of the reel 21.

In the light of the above introduction it should merely be pointed out that in the remainder of this description the terms drum(s), reel and beam will be used with the meanings as defined above.

A belt feed path, along which rolls deviating the belt are present, is defined between the two rotating drums.

Some of these rolls, indicated by 23, 25 and 26, are preferably idle, while the rolls 24a, 24b are counter-rotating and kept pressed against each other by a device 27 which may be of the spring type, pneumatic cylinder type or other.

In accordance with a preferred embodiment, the pair of counter-rotating rolls 24a, 24b is controlled by a permanent-magnet brushless electric motor.

The idle roll 25 is preferably attached in a fixed manner to the floor, or to a wall or to the frame of the apparatus, by means of a load sensor 28 which allows detection of the tension (or pulling force) of the belt 10 wound onto the beam 22.

In particular, the values detected by the sensor 28 are used in conjunction with a suitable adjustment algorithm, in order to control the motor of the beam 22 during the various operating phases of the apparatus, which will be described below.

In a similar manner to the motor of the counter-rotating rolls 24a, 24b, the motors of the actuating groups of the reel 21 and the beam 22 are preferably of the permanent-magnet brushless type.

With reference to FIGS. 3 and 4, it is possible to see how the reel 21 of the corresponding coil, indicated by 31, receives the winding of the belt 10 together with the rubber strip S of a component for the manufacture of tires; on the other hand, numeral 32 indicates the winding consisting of the belt 10 alone without the rubber strip S.

More specifically, the belt 10 that is present on the coil 31 has the two air chambers 13 and 14 that are kept inflated to an operating pressure of about 20 kPa (0.2 bar). For this purpose, the belt is connected, by means of connectors 19 (FIG. 5), to a connection nozzle 35 situated on the reel 21 for supplying fluid under pressure.

The connection nozzle 35 is coupled, in an axial position with respect to the reel, to a sealed coupling for supplying air from a tank 37; the latter may in turn be supplied by the normal compressed-air network of the plant or a compressor associated therewith.

It is important to note that the operating pressure inside the air chambers 13 and 14 must be kept at a predefined level both during unrolling of the belt 10 from the coil 31 and when it is rolled up thereon; for this purpose the apparatus 20 is provided with valves 38, 39 which regulate the air pressure inside the chambers 13, 14 and in the tank 37, as will be explained in greater detail below.

In the winding 32, on the other hand, no air is present inside the chambers 13, 14 and therefore the dimensions thereof, as well as those of the associated beam 22, are smaller.

In order to understand the operating principle of the belt according to the invention, it may be useful to compare first of all FIGS. 1 and 2, wherein some similarities between the respective belts shown therein may be seen.

From this comparison it can be easily understood how the air chambers 13 and 14, which are divided into the segments 13a, 14a, 13b, 14b, etc., when they are kept under pressure, perform the same function as the linear elements 3–6 of the known art, both as regards supporting of the central band 12 of the belt and as regards the spacing of the turns of the coil into which a strip of rubber S is wound.

Obviously the thickness of the inflated air chambers must be such as to prevent compression of the strip S (see FIG. 5).

It is also important to point out that the air chambers 13 and 14, when they are inflated, have an upper and a lower surface that are substantially flat (and in any case not convex) owing to the fact that they are stitched with the threads 17 and 18. This ensures more stable seating between adjacent turns of the wound reel, thereby preventing the negative consequences due to mutual axial displacements caused accidentally.

Indeed, when the belt 10 is rolled up, the lower surface of each segment 13a, 14a, 13b, 14b, etc., of the air chamber 13, 14, rests on the upper surface of a segment of the adjacent turn in the reel so as to ensure a correct superimposed arrangement thereof even in the case of relative axial displacements of adjacent turns, for example following shocks or other similar circumstances.

However, if on the one hand the example of belt according to the invention offers performances which are equivalent to those of the belt of the prior art shown in FIG. 1, on the other hand it is able to overcome all the drawbacks which are associated with the latter and referred to above.

This is due to the fact that the air chambers 13 and 14 may be deflated after the strip S has been separated from the belt 10; in this way it is possible to roll up subsequently the belt forming a winding having dimensions which are markedly smaller than the initial dimensions for storage of the strip S, when the air chambers are under pressure.

Consequently, therefore, the invention is able to provide considerable advantages due to the reduction in volume of the belt wound onto the reel, in particular as regards handling and storage of the empty-belt windings which are re-used in order to store new strips S.

Furthermore, in the case of the invention, the belt 10 supporting the strip S is made entirely of flexible materials such as the DSF fabric mentioned above; this allows the belt to be wound up and unwound in an almost countless number of times, without the danger of breakage thereof due to fatigue.

This important result is not possible, however, in the state of the art shown in FIG. 1 where the linear elements 3–6 are made of a semi-rigid material, the thickness thereof remains unvaried during the various operating phases of the working cycle.

The use of the belt according to the invention during the production of tires is performed preferably in accordance with the method and preferably using the apparatus 20 described hereinbelow.

In FIG. 3 this apparatus is shown during an operating phase of the working cycle wherein the storing coil 31 containing the belt 10 and the rubber strip S is unwound and the former is taken up on the beam 22, while the latter is conveyed away for subsequent use.

In particular, take-up of the belt 10 is performed by rolling it up tightly on the beam 22 so that the various segments 13a, 14a; 13b, 14b, etc, which are progressively supplied into the take-up winding 32, are compressed owing to the tension of the belt and its curvature along the cylindrical surface of the turns.

This compression effect has the function of expelling the air from the segments of the belt 10 which are wound onto the beam and, since these segments intercommunicate along the belt, air will accumulate in the part thereof located upstream of the winding 32: therefore, the pressure of the air in this belt part (which also comprises the coil 31) will tend to increase.

It is preferable to avoid this pressure increase, since it may cause damage to the belt or may prevent it from passing along the deviation rolls; for this reason the apparatus 20 is provided with a vent valve 39 which has the function of keeping the pressure inside the belt below a predefined safety level.

This valve is calibrated so as to release the air when it reaches, inside the chambers 13, 14, a pressure which is greater than a predefined limit (slightly greater than the operating pressure) and preferably not greater than 22 kPa.

It can be understood that, in order to arrange the belt 10 tightly on the take-up winding 32, a high tension must be maintained along the belt section which is located upstream of this winding.

On the other hand, for correct unwinding of the belt 10 which is wound up into the coil 31, it is necessary to prevent compression of the turns of the winding such that the segments of the air chambers 13, 14 remain at the rated operating pressure (about 20 kPa).

Consequently, the belt 10 must not be unwound from the storing coil 31 with an excessively high tension, which would cause compression of the air chambers: along the belt section immediately downstream of the coil 31 it is therefore necessary to maintain a tension T, which is lower than the tension $T_2$ exerted along the section upstream of the winding 32.

The difference in tension along the belt is obtained by means of two counter-rotating rolls 24a, 24b: they are in fact designed to exert during this operating phase of the apparatus, a braking action on the belt 10 which is simultaneously driven by rotation of the beam 22 onto which the take-up winding 32 is collected.

In other words, during this phase, the driving force for moving the belt and winding it onto the beam 22 is provided entirely by the actuating group of the latter; at the same time this force is opposed by the braking action provided mainly by the pair of rolls 24a, 24b and, to a lesser extent, by the first rotating drum which also brakes unwinding of the belt from the storing coil 31 (the various frictional forces arising along the belt path may be disregarded).

Preferably, 95% of the braking action is provided by the opposing rolls 24a, 24b and the remaining 5% is provided by the motor M operating the spindle Z on which the reel 21 is mounted.

During this time interval, the adjustment of the apparatus 20 performed by its control system ensures that the torque of the respective motors which actuate the beam 22 and the rolls 24a, 24b, is kept constant.

Alternatively, the control system of the apparatus 20 might be configured so as to keep the pulling force exerted by the two rotating drums, constant.

As mentioned above, these adjustments have the function of keeping the tension $T_2$ at which the belt 10 is wound onto the beam 22 (detected by the load sensor 28) at the value necessary for obtaining compression of the air chambers 13 and 14.

When the belt 10 has been taken up entirely on the beam 22, it is then removed: it is quite obvious that the fairly compact size of the winding 32 formed by it simplifies considerably the operations.

In the present case, it must be pointed out that the reduced size of the belt taken up on the beam 22, also depends on the fact that the latter may have a smaller diameter than that of the reel 21 (see FIGS. 3 and 4) since the flexibility of the belt 10 according to the invention allows it to be rolled up with a smaller radius of curvature.

As can be seen, therefore, the problems of the prior art associated with the bulky size of the stored belt windings are entirely solved by the invention.

With reference to FIG. 4 it is now possible to consider operation of the apparatus 20 during an operating phase which is the opposite of that considered above.

During this phase, the strip S of a tire component supplied for example by a drawing machine, is wound together with the belt 10, onto the storage coil 31.

Consequently, considering the direction of rotation indicated by the arrows, it can be seen that in this case the belt 10 is unwound from the beam 22 and, following in reverse sequence the path already described above, reaches the deviation roll 23 where it encounters the strip S.

The latter is placed onto the belt, following which they are wound together onto the reel 21, thus building up the storing coil 31 which will then be used during the production of tires in the manner already described.

It must be pointed out here that the force required to move the belt 10 during this phase, is provided mainly by the pair of counter-rotating rolls 24a, 24b and to a lesser extent by the motor M of the actuating group for the reel 21, while the beam 22 exerts only a braking action on the belt which has the function of keeping it at the tension $T_2$ required to obtain compression of the air chambers 13 and 14 in accordance with what was already explained above.

In particular, preferably 95% of the power for feeding the belt is provided by the motor of the rolls 24a, 24b and the remaining 5% is provided by the actuating motor M.

Operation of the apparatus 20 during this phase may be briefly summarised as follows.

The air chambers 13 and 14 of the wound belt combined with the strip S inside the coil 31, are kept at the operating pressure of 20 kPa; this is performed by the valve 38 which, as the belt 10 is wound around the coil 31 (and therefore the pressure inside it tends to decrease), allows the supply of an air flow from the compressed-air supply system to the coupling 36, preferably via the tank 37, so as to keep the pressure at the predefined level.

In other words, the valve 38 is a regulating device which is set to a pressure value (preferably not less than 18 kPa) lower than the rated pressure inside the air chambers 13 and 14, and which has the function of controlling the flow of air necessary to restore the desired pressure (i.e. 20 kPa) in the storage coil 31.

The tank 37, on the other hand, acts as a plenum chamber for preventing oscillations and sudden pressure rises inside the air chambers.

In a similar manner to that which occurs during the other operating phase, in this case also it is necessary to avoid compression of the turns (and therefore of the air chambers 13, 14) of the coil 31; for this purpose, the tension $T_2$, along the belt section between this coil and the opposing rolls 24a, 24b, must be controlled with reference to a predefined value.

On the other hand, however, the belt part wound onto the beam 22 must remain under a high tension $T_2$ so as to maintain compression of the air chambers 13 and 14 along the cylindrical surface of the turns of the winding 32, as already mentioned above.

This high tension $T_2$ is obtained by means of the driving action of the belt 10 which is provided by the counter-rotating rolls 24a, 24b and which is opposed by the braking action caused by the beam 22.

By way of completion of the description of the preceding example, some purely exemplary numerical data are provided in the table below, which refer to respective dimensional and functional parameters of the prototype system described above.

It should merely be pointed out that, in the table, the internal diameter of the storage coil 31 must be regarded as being the external diameter of the core onto which the belt 10 together with the strip S is wound.

TABLE

| | |
|---|---|
| External diameter of storage coil | 1300 mm |
| Internal diameter of storage coil | 500 mm |
| Width of belt | 410 mm |
| Length of belt | 75 mm |
| Width of belt air chambers (inflated) | 55 mm |
| Height of air chambers (inflated) | 15 mm |
| Nominal pressure of air chambers | 20 kPa |
| Winding tension of belt on the storage coil | 50 N |
| Winding tension of belt on take-up beam | 1000 N |
| Power of the pulling (counter-rotating rolls) group | 1 kW |
| Power of the storage coil motor | 100 W |
| Power of the beam motor | 1 kW |
| Capacity of the air tank | 0.02 m$^3$ |

Preferably, the model GD 25 produced by the Italian company TURIAN was chosen as the rotary coupling.

Moreover, as regards the operating speed of the apparatus, during the operating phase shown in FIG. 4, the feed speed of the belt 10 must be preferably substantially the same as that of the strip S supplied by the drawing machine, so as to allow correct uniting thereof and subsequent winding onto the reel 31, without relative slipping of belt and strip.

This speed may vary depending on the cases but usually is between 2 and 20 m/min.

During the operating phase shown in FIG. 3, on the other hand, the speed will depend on the methods for production of the tyres for which the strip S is intended, downstream of the apparatus 20; therefore supplying of the strip S may also not be continuous, that is to say that interruptions may occur, for example, after manufacture of a tire and before the start of processing of the next tyre.

For the feeding speed of the belt 10 it is possible, however, to refer, by way of an initial guide, to the values indicated above for reverse operation of the apparatus.

Obviously variations of the invention with respect to that described hitherto are possible.

For example, as already mentioned above the division of the air chambers 13 and 14 into segments 13a, 14a, 13b, 14b, etc, is not indispensable; these segments have the function, in fact, of facilitating rolling-up of the belt when the pressure is maintained inside it, but they could also be eliminated, in particular in the case they are used for small pressures lower than those considered.

This will depend above all on the dimensions (width, thickness, etc.) of the belt and on the type of material used to manufacture it.

In this connection it must be pointed out that the formation of the belt 10 with two superimposed sheets joined together, is only one preferred, but not the sole, embodiment; for example, it is possible to imagine making the central band 12 with a material different from that of the two air chambers 13 and 14 (for example plastic or other material) and hence fixing it thereto by means of stitching, gluing or other means.

It is also obvious that, although the belt has been provided for supporting tire components, it may in any case be advantageously applied in all those areas where operating conditions similar to those considered here exist. Indeed it may be understood that with the belt according to the invention it is possible to support strips not only of rubber, but also of other material, for example paper (cellulose or the like), textile or others.

The apparatus with which the belt according to the invention is used may also be configured differently from that which has been described hitherto.

In other words, it is possible to state that the belt of the invention, owing to its operating principle based on the possibility of inflating and deflating it in accordance with the operational requirements, opens up the way for several applications which can be implemented using apparatus that may vary from case to case.

For example, the operating mode of the above apparatus 20 is based on the fact of taking up or unwinding the belt 10, with a high tension $T_2$ in the winding 32 and a low tension $T_1$ in the coil 31.

As already explained, this allows control of the air present inside the belt and take-up of the latter in a winding having dimensions smaller than those of the known art.

In this case the variation in tension of the belt between the rotating drums is obtained using a suitable pulling group comprising the two counter-rotating rolls 24a, 24b which, during one operating phase, have the function of braking the belt and, during the other phase, of driving it, coordinating the action with that of the drums onto which the belt turns are wound.

It is possible to understand, however, that the methods by means of which the tension of the belt between the two drums is varied may differ from this operating system; for example, it is also possible to use other means which are different from the counter-rotating rolls.

It also hardly needs to be mentioned that, in order to brake the abovementioned drums, it is possible to use proper brakes instead of adjusting the action of the associated actuating motors.

Finally, it is also obvious that supplying of the air to the chambers 13, 14 of the belt may also be performed using systems other than those considered above.

For example it is possible to consider providing an apparatus wherein the tank 37 is located inside the reel 21 of the storage coil 31, instead of at a distance therefrom. Also, as regards the connection of the air chambers to this tank, it is therefore possible to have solutions which are different from those schematically shown in the drawings.

These and other possible variations, however, all fall within the scope of the claims which follow.

What is claimed is:

1. A belt for supporting strips of deformable material, comprising:
    a flexible central band onto which one or more strips of the deformable material are placed, wherein variable-configuration spacing elements are arranged along edges of the central band;
    wherein the spacing elements are air chambers, and
    wherein the air chambers, when inflated, have respective upper and lower surfaces that are substantially flat and substantially parallel to the central band.

2. The belt of claim 1, wherein threads extend between the upper and lower surfaces of the air chambers, and
    wherein, when the air chambers are inflated, the threads mutually retain the upper and lower surfaces substantially parallel to the central band.

3. The belt of claim 2, wherein the air chambers are transversely divided, with respect to a longitudinal extension of the air chambers, into intercommumcating segments.

4. The belt of claim 3, wherein the belt is formed by two sheets of flexible material,
    wherein the two sheets of flexible material are superimposed in a region of the central band, and
    wherein the two sheets of flexible material are separated from each other in zones adjacent to the region to form the air chambers.

5. The belt of claim 4, wherein the flexible material is a fabric impermeable to air.

6. The belt of claim 5, wherein the fabric is impermeable to air due to a lining comprising one or more of plasticized polyvinyl chloride, polychloroprene, or chlorosulfonated polyethylene.

7. The belt of claim 6, wherein the threads extending between the upper and lower surfaces of the air chambers are applied by stitching the threads to the sheets of fabric.

8. The belt of claim 1, wherein the strips are rubber components for tyres.

9. An apparatus for using the belt of claim 1, comprising:
a storage coil, wherein a first part of the belt is wound onto a reel with a predefined first tension;
a take-up winding, wherein a second part of the belt is wound onto a beam with a second tension greater than the first tension;
first devices for varying the first tension and the second tension;
second devices for keeping the air chambers inflated in the first part of the belt; and
third devices for rotating the reel and the beam.

10. The apparatus of claim 9, wherein the first devices comprise a pair of counterrotating rolls forced towards each other, and
wherein the belt is passed between the pair of counterrotating rolls.

11. The apparatus of claim 9, wherein the second devices comprise a pressurized tank connected to the air chambers with a rotary-type coupling.

12. A method for feeding a strip of deformable material to a user, comprising the steps of:
providing a belt for supporting the strip, wherein the belt has a flexible central band and air chambers arranged along edges of the central band;
providing a storage coil, wherein the strip, supported by the central band of the belt, is wound onto a reel together with a first part of the belt while keeping the air chambers under pressure; and
unwinding the reel to convey the strip toward the user and to roll up a second part of the belt separated from the strip after having deflated the air chambers of the second part of the belt.

13. The method of claim 12, wherein the air chambers are deflated by winding the second part of the belt onto a beam with a predefined first tension greater than a second tension with which the first part of the belt is unwound from the reel, and wherein air is allowed to escape from the second part of the belt.

14. A method for storing a strip of deformable material on a storage coil, comprising the steps of:
providing a belt for supporting the strip, wherein the belt has a flexible central band, and wherein air chambers are arranged along edges of the central band;
arranging a first part of the belt on a beam of a take-up winding with the air chambers of the first part of the belt deflated;
maintaining the air chambers deflated on any portion of the first part of the belt remaining wound on the beam; and
winding a second part of the belt onto a reel, together with a strip placed on the belt, to form the storage coil;
wherein the air chambers of the second part of the belt are inflated before or during the winding step.

15. The method of claim 14, wherein the air chambers on the part of the belt on the beam of the take-up winding are maintained deflated by unwinding the belt from the beam of the take-up winding with a predefined first tension greater than a second tension with which the belt is wound onto the reel.

16. A belt for supporting strips of deformable material, comprising:
a flexible central band;
wherein one or more strips of the deformable material are placed onto the central band,
wherein variable-configuration air chambers are arranged along edges of the central band, and
wherein the air chambers are deflatable and inflatable.

17. The belt of claim 16, wherein the air chambers comprise respective upper and lower surfaces,
wherein, when the air chambers are inflated, the respective upper and lower surfaces are substantially flat, and
wherein, when the air chambers are inflated, the respective upper and lower surfaces are substantially parallel to the central band.

18. The belt of claim 16, wherein the air chambers comprise respective upper and lower surfaces,
wherein threads extend between the respective upper and lower surfaces, and
wherein, when the air chambers are inflated, the threads mutually retain the respective upper and lower surfaces substantially parallel to the central band.

19. The belt of claim 16, wherein the air chambers are transversely divided, with respect to a longitudinal extension of the air chambers, into intercommunicating segments.

20. The belt of claim 16, wherein the belt is formed by two sheets of flexible material,
wherein the two sheets are superimposed in a region of the central band, and
wherein the two sheets are separated from each other in zones adjacent to the region to form the air chambers.

21. The belt of claim 20, wherein the flexible material is a fabric impermeable to air.

22. The belt of claim 21, wherein the fabric is impermeable to air due to a lining comprising one or more of plasticized polyvinyl chloride, polychioroprene, or chlorosulfonated polyethylene.

23. The belt of claim 21, wherein the threads extending between the upper and lower surfaces of the air chambers are applied by stitching the threads to the sheets of fabric.

24. The belt of claim 16, wherein the strips are rubber components for tyres.

25. An apparatus for using the belt of claim 16, comprising:
a storage coil;
a take-up winding;
first devices;
second devices; and
third devices;
wherein a first part of the belt is wound onto a reel of the storage coil with a predefined first tension,
wherein a second part of the belt is wound onto a beam of the take-up winding with a second tension greater than the first tension,
wherein the first devices vary the first and second tension,
wherein the second devices keep the air chambers in the first part of the belt inflated, and
wherein the third devices rotate the reel and the beam.

26. The apparatus of claim 25, wherein the first devices comprise a pair of counterrotating rolls forced towards each other, and
wherein the belt is passed between the pair of counterrotating rolls.

27. The apparatus of claim 25, wherein the second devices comprise a pressurized tank connected to the air chambers with a rotary-type coupling.

* * * * *

UNITED STATES PATENT AND TRADEMARK OFFICE
CERTIFICATE OF CORRECTION

PATENT NO.     : 6,755,370 B2
DATED          : June 29, 2004
INVENTOR(S)    : Alessandro Volpi It is certified that error appears in the above-identified patent and that said Letters Patent is hereby corrected as shown below:

Title page,
Item [73], Assignee, "Spa," should read -- SPA --.

Column 10,
Line 60, "intercommumcating" should read -- intercommunicating --.

Column 12,
Line 36, "polychioroprene," should read -- polychloroprene, --.

Signed and Sealed this

Twelfth Day of October, 2004

JON W. DUDAS
*Director of the United States Patent and Trademark Office*